United States Patent
Iwata et al.

(10) Patent No.: US 9,353,256 B2
(45) Date of Patent: May 31, 2016

(54) EPOXY RESIN COMPOSITION FOR FIBER-REINFORCED COMPOSITE MATERIAL

(75) Inventors: Mitsuhiro Iwata, Hiratsuka (JP); Tomohiro Ito, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 111 days.

(21) Appl. No.: 14/116,296

(22) PCT Filed: Apr. 11, 2012

(86) PCT No.: PCT/JP2012/059879
§ 371 (c)(1),
(2), (4) Date: Nov. 7, 2013

(87) PCT Pub. No.: WO2012/153595
PCT Pub. Date: Nov. 15, 2012

(65) Prior Publication Data
US 2014/0107254 A1    Apr. 17, 2014

(30) Foreign Application Priority Data

May 9, 2011  (JP) .................................. 2011-104405

(51) Int. Cl.
| | | |
|---|---|---|
| *B32B 27/38* | (2006.01) | |
| *B32B 27/04* | (2006.01) | |
| *B32B 27/26* | (2006.01) | |
| *C08L 63/00* | (2006.01) | |
| *C08G 59/20* | (2006.01) | |
| *C08G 59/30* | (2006.01) | |
| *C08G 59/40* | (2006.01) | |
| *C08J 5/24* | (2006.01) | |
| *C08G 59/68* | (2006.01) | |

(52) U.S. Cl.
CPC ............... *C08L 63/00* (2013.01); *C08G 59/304* (2013.01); *C08G 59/4021* (2013.01); *C08G 59/686* (2013.01); *C08J 5/24* (2013.01); *C08J 2363/00* (2013.01)

(58) Field of Classification Search
CPC ..... C08L 63/00; C08L 2201/02; C08G 59/20; C08G 59/304; C08G 59/3272; C08G 59/4021; B32B 27/04; B32B 27/26; B32B 27/38; C08J 5/24
USPC .......................... 523/427, 428, 433, 435, 461; 428/297.4, 413
See application file for complete search history.

(56) References Cited

U.S. PATENT DOCUMENTS

| | | | | |
|---|---|---|---|---|
| 2004/0034127 A1* | 2/2004 | Taguchi et al. | ................ | 523/400 |
| 2007/0027274 A1 | 2/2007 | Antelmann et al. | | |
| 2012/0071585 A1* | 3/2012 | Nohara et al. | ................ | 523/433 |

FOREIGN PATENT DOCUMENTS

| | | | |
|---|---|---|---|
| CN | 1946780 | 4/2007 | |
| EP | 1 731 553 | 12/2006 | |
| JP | 2007-504341 | 3/2007 | |
| JP | 2007-291227 | 11/2007 | |
| JP | 2010-275506 | 12/2010 | |
| WO | WO 2005-082982 | 9/2005 | |
| WO | WO 2010140351 A1 * | 12/2010 | ............. C08G 59/08 |

OTHER PUBLICATIONS

International Search Report dated May 15, 2012, 2 pages, Japan.

* cited by examiner

*Primary Examiner* — Michael J Feely
(74) *Attorney, Agent, or Firm* — Thope North & Western

(57) ABSTRACT

The present technology is an epoxy resin composition for a fiber-reinforced composite material comprising a phosphorus-containing epoxy resin containing phosphorus in the skeleton thereof, a dicyandiamide, and a curing promoter containing at least one selected from 1,1'-(4-methyl-1,3-phenylene)bis(3,3-dimethylurea), phenyl-dimethylurea represented by the following formula (1), and methylene-diphenyl-bisdimethylurea represented by the following formula (2); wherein the phosphorus content of the phosphorus-containing epoxy resin is at least 1.0 mass % and at most 5.0 mass % in the epoxy resin composition.

Formula 1

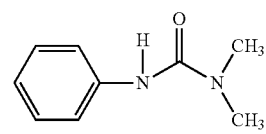

(1)

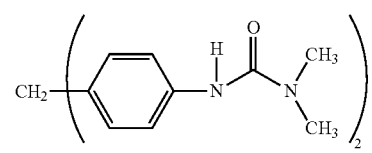

(2)

17 Claims, 1 Drawing Sheet

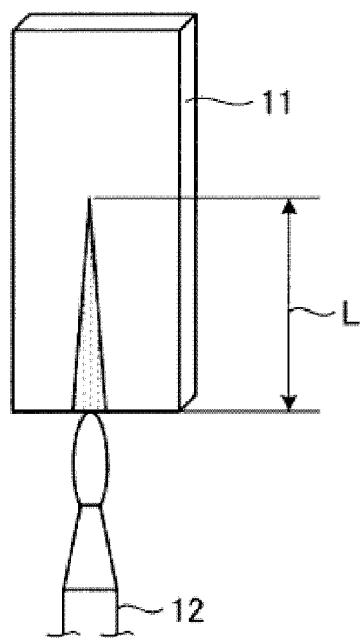

EPOXY RESIN COMPOSITION FOR FIBER-REINFORCED COMPOSITE MATERIAL

TECHNICAL FIELD

The present technology relates to an epoxy resin composition for a fiber-reinforced composite material which provides a carbon fiber-reinforced composite material having excellent curability and flame retardancy and demonstrates excellent storage stability.

BACKGROUND

Fiber-reinforced composite materials using a thermosetting resin such as an epoxy resin as a matrix resin—in particular, carbon fiber-reinforced composite materials using carbon fibers—are used in a wide range of fields such as the field of structural materials for aircraft, automobiles, and the like, the reinforcement of concrete structures, and sports fields such as golf clubs, tennis rackets, and fishing poles due to the light weight and excellent dynamic properties thereof. Carbon fiber-reinforced composite materials not only have excellent dynamic properties, but carbon fibers also have conductivity, and composite materials thereof have excellent electromagnetic wave-shielding properties. Therefore, carbon fiber-reinforced composite materials are also used for the cases of electronic/electrical equipment such as laptops and video cameras and are useful for reducing the case thickness and reducing the weight of the equipment. Such carbon fiber-reinforced composite materials are often obtained by laminating a prepreg obtained by impregnating reinforcing fibers with thermosetting resin.

Examples of the characteristics required of a prepreg used in such an application include the excellent physical properties of the molded product such as heat resistance and impact resistance, of course, as well as excellent storage stability at room temperature and proper curing under prescribed curing conditions (curing temperature, curing time, and the like).

Of the various applications of fiber-reinforced composite materials, there is a demand for structural materials of aircraft, automobiles, or building materials or the like, in particular, to have flame retardancy so that the materials do not ignite and combust due to fire. There is also a demand for the flame retardancy of materials for electronic/electrical equipment in order to prevent accidents in which a case, a part, or the like ignites and combusts when due to heat generated from within the device or the exposure of the outside to high temperatures.

Halogen flame retardants have been conventionally used to provide flame retardancy to carbon fiber-reinforced composite materials. Examples of halogen flame retardants that have been used are halogenated epoxy resins having a halogen such as bromine in an epoxy resin or flame-retardant epoxy resin compositions which provide flame retardancy to a halogenated epoxy resin by using antimony trioxide ($Sb_2O_3$) as a flame retardant. Adding antimony trioxide to a halogenated epoxy resin yields a substantial radical trapping effect in the gaseous phase and air shielding effect in the gaseous phase as well as a high flame retarding effect.

While these halogen flame retardants have excellent flame retardancy when added in small quantities, there is a possibility of generating toxic gases such as halogenated hydrogen and organic halides at the time of combustion, which may have an adverse effect on the human body or the natural environment. In addition, the antimony trioxide used together with halogen flame retardants is harmful and must be handled carefully. Moreover, since antimony trioxide has toxicity with powders, it is preferable for the resin composition to contain no antimony trioxide whatsoever out of consideration of the effects on the human body and the environment. Therefore, flame-proofing with a non-halogen which does not contain halogens or antimony trioxide and demonstrates excellent flame retardancy has been promoted.

During the course of the background described above, epoxy resin compositions formed by combining phosphorus compounds such as red phosphorus and phosphoric acid esters or metal oxides such as magnesium oxide and aluminum oxide have been widely studied as flame retardants to be used instead of halogen flame retardants (see WO/2005/082982). WO/2005/082982 describes an epoxy resin composition for a carbon fiber-reinforced composite material which contains an epoxy resin, an amine curing agent, and a phosphorus compound with a phosphorus atom concentration within a prescribed range so that the material has excellent flame retardancy and dynamic properties, does not generate halogen gas when combusted, and can be suitably used as a fiber composite material.

When a phosphorus compound or a metal oxide is added to a thermosetting resin such as an epoxy resin as an alternative flame retardant, it is necessary for the phosphorus compound or the metal oxide to be added in a large quantity in order to achieve sufficient flame retardancy. However, when the phosphorus compound or the metal oxide is added in a large quantity, there is the problem of the diminishment of the physical properties of a cured product obtained by curing the epoxy resin composition such as a decrease in the strength of the cured product.

In addition, when the curability increases at a low temperature of approximately 120° C., the reactivity typically improves, which leads to the diminishment of storage stability. Therefore, when a conventional epoxy resin composition for a carbon fiber-reinforced composite material is used as a prepreg for an aircraft or the like, the epoxy resin composition must be curable and have excellent storage stability even at a temperature of approximately 120° C.

Therefore, with conventional technology, it has been difficult to obtain a cured product which takes into consideration the effects on the body and the environment and demonstrates excellent physical properties and good flame retardancy. The present situation is thus that no flame-retardant epoxy resin composition which is curable at approximately 120° C., is environmentally sound, demonstrates excellent storage stability, and yields a cured product having good flame retardancy and excellent physical properties has been found as a flame-retardant epoxy resin composition.

SUMMARY

The present technology provides an epoxy resin composition for a fiber-reinforced composite material which is curable at approximately 120° C., is environmentally sound, demonstrates excellent storage stability, and yields a cured product having good flame retardancy and excellent physical properties.

The present technology is described in the following (1) to (5).

(1) An epoxy resin composition for a fiber-reinforced composite material comprising: a phosphorus-containing epoxy resin containing phosphorus in a skeleton thereof;
a dicyandiamide; and
a curing accelerator containing at least one selected from 1,1'-(4-methyl-1,3-phenylene)bis(3,3-dimethylurea), phenyl-dimethylurea represented by the following formula (1), and methylene-diphenyl-bisdimethylurea represented by the following formula (2);
wherein,
the phosphorus content of the phosphorus-containing epoxy resin is at least 1.0 mass % and at most 5.0 mass % in the epoxy resin composition.

Formula 1

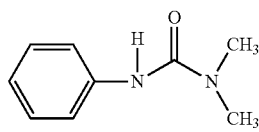
(1)

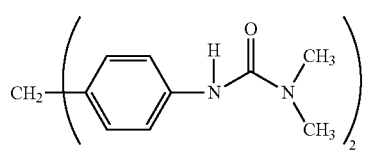
(2)

(2) The epoxy resin composition for a fiber-reinforced composite material according to (1) described above, wherein the content of the curing accelerator is at least 1 part by mass and at most 15 parts by mass with respect to 100 parts by mass of a sum of the mass of the phosphorus-containing epoxy resin and other epoxy resins.

(3) The epoxy resin composition for a fiber-reinforced composite material according to (1) or (2) described above, comprising a phenoxy resin.

(4) The epoxy resin composition for a fiber-reinforced composite material according to (3) described above, wherein the content of the phenoxy resin is at least 5 parts by mass and at most 40 parts by mass with respect to 100 parts by mass of a sum of the mass of the phosphorus-containing epoxy resin and the other epoxy resins.

(5) A prepreg obtained by impregnating reinforcing fibers with the epoxy resin composition for a fiber-reinforced composite material according to any one of (1) to (4) described above.

With the present technology, it is possible to obtain a cured product which is curable at 120°, is environmentally sound, demonstrates excellent storage stability, and has good flame retardancy and excellent physical properties.

BRIEF DESCRIPTION OF THE DRAWING

FIG. 1 illustrates the state of a vertical flame test.

DETAILED DESCRIPTION

The present technology is explained in detail below. However, the present technology is not limited by the embodiments of the technology (hereinafter referred to as the "embodiments") described hereinafter. Furthermore, the constituents described in the embodiments include constituents that could be easily conceived by a person skilled in the art and constituents that are essentially identical, or, in other words, are equivalent in scope. Moreover, the constituents described in the embodiments can be combined as desired.

The epoxy resin composition for a fiber-reinforced composite material of this embodiment (hereinafter referred to as the "composition of this embodiment") is an epoxy resin composition for a fiber-reinforced composite material comprising a phosphorus-containing epoxy resin containing phosphorus in the skeleton thereof, a dicyandiamide, and a curing accelerator, wherein the composition is curable at 120° C.

<Phosphorus-Containing Epoxy Resin>

The phosphorus-containing epoxy resin consists of a compound represented by the following formula (3).

Formula 2

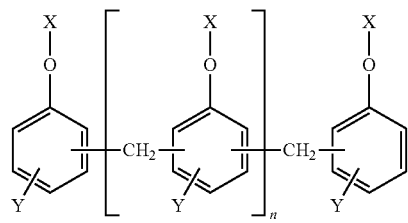
(3)

In the formula, n is an integer greater than or equal to 1. X is a group represented by the following formula (I), (II), or (III), and (n+2) of the X groups in formula (3) may be the same or different. However, at least one of all of the X groups in the epoxy resin is a group represented by the formula (I) or (II), and at least one is a group represented by the formula (III). Y is —H or —CH$_3$, and (n+2) of the Y moieties in formula (3) may be the same or different.

Formula 3

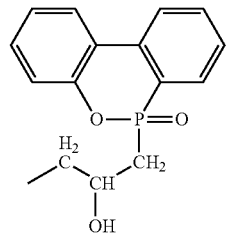
(I)

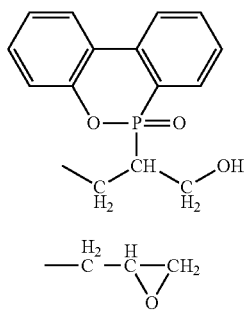
(II)

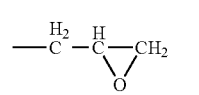
(III)

In formula (3), n is an integer greater than or equal to 1, and n is preferably from 1 to 10 and more preferably from 1 to 5. An excellent balance of heat resistance and fluidity is achieved when n is 10 or less.

The phosphorus-containing epoxy resin may consist of a compound in which some of the (n+2) of the X groups in formula (3) are groups represented by formula (I) or (II) and some are groups represented by formula (III). The phosphorus-containing epoxy resin may also be a mixture of a compound in which some or all of the (n+2) of the X groups in formula (3) are groups represented by formula (I) or (II) and a compound in which all of the X groups are groups represented by formula (III).

A commercially available product may be used as the phosphorus-containing epoxy resin, and a product synthesized by a known production method may also be used. Examples of commercially available products include "FX-289Z1" and "FX-0921" and the like produced by Tohto Kasei Co., Ltd. An example of a production method of the phosphorus-containing epoxy resin is a method of reacting a compound represented by the following formula (4) (9,10-dihydro-9-oxa-10-phosphaphenanthrene-10-oxide (also called DOPO hereafter)) with an epoxy resin in which all of the (n+2) of the X groups in formula (3) are groups represented by formula (III) (for example, a phenol novolac epoxy resin or a cresol novolac epoxy resin) at a high temperature in the presence of a catalyst. At this time, the amount of DOPO used is an amount with which some of the epoxy groups in the epoxy resin of the starting material remain after the reaction.

Formula 4

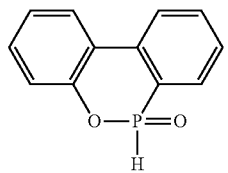

(4)

The phosphorus-containing epoxy resin contained in the composition of this embodiment may consist of one type or two or more types.

The phosphorus content of the phosphorus-containing epoxy resin is preferably at least 1.0 mass % and at most 5.0 mass % and more preferably at least 1.3 mass % and at most 3 mass % in the epoxy resin composition. Although the flame retardancy of the cured product of the resulting resin composition improves as the phosphorus content of the phosphorus-containing epoxy resin increases, this may also induce a decrease in curability at low temperatures. On the other hand, the flame retardancy of the resulting resin composition is diminished when the phosphorus content of the phosphorus-containing epoxy resin is lower. Therefore, the flame retardancy and heat resistance of a cured product such as a prepreg obtained from the composition of this embodiment can be improved by controlling the phosphorus content of the phosphorus-containing epoxy resin to within the range described above.

The compounded amount of the phosphorus-containing epoxy resin in the composition of this embodiment is preferably at least 75 parts by mass and at most 95 parts by mass and more preferably at least 80 parts by mass and at most 90 parts by mass with respect to 100 parts by mass of the total amount of epoxy resins contained in the epoxy resin composition. By controlling the compounded amount to at least 75 parts by mass, the phosphorus content of the epoxy resin composition increases, which makes it possible to provide sufficient flame retardancy. When the compounded amount is at most 95 parts by mass, it is possible to provide the epoxy resin composition with moderate viscosity and handleability. Therefore, when the compounded amount of the phosphorus-containing epoxy resin is within the range described above, it is possible to respectively achieve the toughness, heat resistance, and flame retardancy of the resin cured product to a high degree.

(Other Epoxy Resins)

The composition of this embodiment may contain other epoxy resins other than the phosphorus-containing epoxy resin within a range that does not inhibit the effect of the present technology. Examples of such epoxy resins include bisphenol epoxy resins, novolac epoxy resins, trisphenolmethane epoxy resins, glycidyl amine epoxy resins, aminophenol epoxy resins, naphthalene epoxy resins, isocyanate-modified epoxy resins, and the like. Examples of bisphenol epoxy resins include bisphenol A epoxy resins and bisphenol F epoxy resins. One type of these may be used alone, or two or more types may be used in combination. Of these, bisphenol epoxy resins are preferable.

<Dicyandiamide>

A dicyandiamide is used as a curing agent of the epoxy resin. The curing agent may generally have any structure as long as the curing agent is capable of curing the epoxy resin, and a known curing agent may be used. Specific examples of curing agents include amines, acid anhydrides, novolac resins, phenols, mercaptans, Lewis acid-amine complexes, onium salts, imidazoles, and the like. Of these, amine curing agents are preferable. Examples of amine curing agents that can be used include aromatic amines such as diaminodiphenylmethane and diaminodiphenylsulfone, aliphatic amines, imidazole derivatives, dicyandiamide, tetramethylguanidine, thiourea-added amines, and the like, and isomers and modified products thereof. Of these, dicyandiamide is particularly preferable due to the excellent prepreg storage stability thereof and is used as the curing agent for the epoxy resin in this embodiment.

The compounded amount of the dicyandiamide in the composition of this embodiment is preferably an amount at which the ratio of equivalents of active hydrogen in the curing agent to equivalents of the epoxy in the epoxy resin composition excluding the curing agent is at least 0.5 and at most 1 and is more preferably at least 0.6 and at most 0.8. The composition can be sufficiently cured when the ratio is at least 0.5. The toughness of the cured product can be increased when the ratio is at most 1.

<Curing Accelerator>

The curing accelerator contained in the composition of this embodiment is a condensation catalyst for curing the composition of this embodiment. The curing accelerator has the effect of promoting the curing reaction of dicyandiamide used as a curing agent. The curing accelerator used in the composition of this embodiment is not particularly limited as long as the curing accelerator has the effect of promoting the curing reaction of dicyandiamide, and a conventionally known curing accelerator may be used. Examples of curing accelerator include urea derivatives such as 1,1'-(4-methyl-1,3-phenylene)bis(3,3-dimethylurea), phenyl-dimethylurea represented by the following formula (1), methylene-diphenyl-bisdimethylurea represented by the following formula (2), 3-phenyl-1,1-dimethylurea, 3-(3,4-dichlorophenyl)-1,1-dimethylurea (DCMU), and 3-(3-chloro-4-methylphenyl)-1,1-dimethylurea, urea compounds such as tertiary amines, imidazole compounds, and phenyldimethylurea (PDMU), and amine complexes such as trifluoride-monoethylamine and trichloride-amine complexes, and the like. These curing accelerator may be used alone or as a mixture of two or more types.

Formula 5

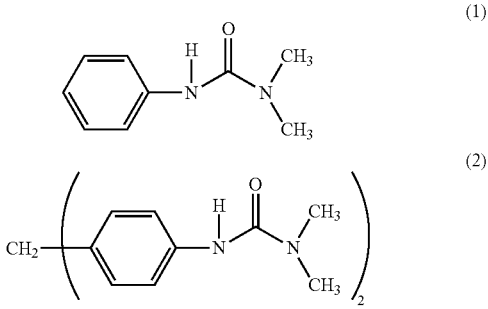

Of these, examples of particularly preferable curing promoters in this embodiment include 1,1'-(4-methyl-1,3-phenylene)bis(3,3-dimethylurea), phenyl-dimethylurea represented by formula (1), and methylene-diphenyl-bisdimethylurea represented by formula (2).

The content of the curing accelerator contained in the composition of this embodiment is at least 1 part by mass and at most 15 parts by mass and preferably at least 3 parts by mass and at most 10 parts by mass with respect to 100 parts by mass of the sum of the mass of the phosphorus-containing epoxy resin and other epoxy resins. When the content of the curing accelerator is within the range described above, the fast curing properties of the resulting composition of the present technology improve further, while the glass transition temperature Tg of the resulting composition of the present technology after curing increases and the durability after curing also improves.

<Phenoxy Resin>

It is preferable for the epoxy resin composition for a fiber-reinforced composite material of the present technology to contain a phenoxy resin from the perspective of improving the toughness of the composition and improving workability by controlling the viscosity of the uncured composition. The phenoxy resin is polyhydroxy polyether, a thermoplastic resin synthesized from bisphenols and epichlorohydrin.

The phenoxy resin contained in the composition of this embodiment contains a phenoxy resin represented by the following formula (6).

Formula 6

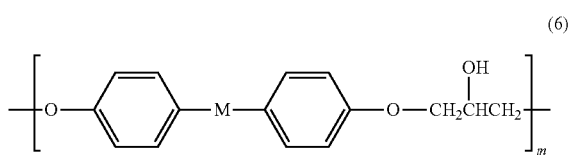

In formula (6), M is at least one selected from $C(CH_3)_2$, $CH_2$, and $SO_2$ and may be a copolymer of two or more types.

Examples of phenoxy resins that can be used include bisphenol A phenoxy resins, bisphenol F phenoxy resins, bisphenol A and bisphenol F phenoxy resins, bisphenol S phenoxy resins, and the like.

The mass-average molecular weight of such a phenoxy resin is preferably from 10,000 to 100,000 and is more preferably from 20,000 to 70,000 from the perspective of providing the composition with toughness.

The content of the phenoxy resin is preferably at least 5 parts by mass and at most 40 parts by mass and more preferably at least 10 parts by mass and at most 30 parts by mass with respect to 100 parts by mass of the sum of the phosphorus-containing epoxy resin and other epoxy resins. When the content of the phenoxy resin is at least 5 parts by mass, it is possible to provide toughness and to control the resin flow (overflow prevention). When the content of the phenoxy resin is at most 40 parts by mass, it is possible to maintain the tack (surface tackiness), drape (flexibility to conform to a shape), heat resistance, solvent resistance, and the like of the resin when used as a prepreg.

In this way, the composition of this embodiment is an epoxy resin composition for a fiber-reinforced composite material comprising a phosphorus-containing epoxy resin, a dicyandiamide, and a curing accelerator and is curable at 120° C. With the composition of this embodiment, it is possible to form a cured product which is curable at 120° C., is environmentally sound without having adverse effects on the human body or the natural environment, demonstrates excellent storage stability, and has good flame retardancy and excellent physical properties, and it is possible to obtain a cured product with excellent flame retardancy and reliability.

Conventionally, it has been possible to achieve sufficient flame retardancy by adding a phosphorus compound or a metal oxide in a large quantity to a thermosetting resin such as an epoxy resin. However, adding a phosphorus compound in a large quantity conventionally induced the diminishment of heat resistance, strength, or the like. Adding a metal oxide in a large quantity also induced the diminishment of the physical properties of the resulting cured product such as reduced strength. In addition, when $Sb_2O_3$ was used as a flame retardant in a halogenated epoxy resin containing a halogen such as bromine, a flame retardant epoxy resin composition capable of providing high flame retardancy was obtained without the inducing the diminishment of physical properties in small amounts $Sb_2O_3$ (for example, approximately 3 mass %). However, there is a possibility of generating toxic gases such as halogenated hydrogen and organic halides when curing the resin composition by combustion, and taking into consideration the effects on the human body and the environment, it was necessary to develop an epoxy resin composition for a fiber-reinforced composite material demonstrating excellent flame retardancy without actively using $Sb_2O_3$ or the like.

In contrast, the composition of this embodiment is environmentally sound without adversely affecting the human body or the natural environment and demonstrates excellent storage stability. A cured product obtained from the composition of this embodiment has excellent physical properties such as good flame retardancy and high strength, and a highly reliable cured product can be obtained.

The composition of this embodiment may contain additives as necessary within a range that does not inhibit the purpose of the present technology in addition to the phosphorus-containing epoxy resin, dicyandiamide, curing accelerator, other epoxy resins, and phenoxy resin described above. Examples of additives include plasticizers, fillers, reactive diluents, curing catalysts, thixotropy-imparting agents, silane coupling agents, pigments, dyes, anti-aging agents, antioxidants, antistatic agents, flame retardants, drying oils adhesiveness-imparting agents, dispersing agents, dehydrating agents, ultraviolet absorbers, solvents, and the like. The composition may contain two or more types of these additives.

The production method of the composition of this embodiment is not particularly limited, and the composition can be produced with a conventionally known method, for example. For example, the composition can be obtained by uniformly mixing a phosphorus-containing epoxy resin, a dicyandiamide, a curing accelerator, a phenoxy resin, and other components such as plasticizers as necessary at room temperature. An example of the mixing method for the respective components is a method using a mixer such as a three-roll mill, a planetary mixer, a kneader, a universal blender, a homogenizer, and a homodisper.

As described above, since the composition of this embodiment is curable at 120° C., the composition can be suitably used as a resin for a prepreg (precursor for a composite material formed by combining a matrix resin and reinforcing fibers) for an aircraft, for example.

<Prepreg>

The composition of this embodiment can be impregnated in reinforcing fibers and used as a prepreg. The reinforcing fibers are not particularly limited, and examples of reinforcing fibers that can be used include various inorganic or organic fibers such as carbon fibers, aramid fibers, nylon fibers, high-strength polyester fibers, glass fibers, boron fibers, alumina fibers, silicon nitride fibers, and steel fibers. Of these, carbon fibers, aramid fibers, glass fibers, boron fibers, alumina fibers, and silicon nitride fibers are preferable from the perspective of flame retardancy. The form of the reinforcing fibers may be such that the fibers are aligned in one direction, may be woven, or may be a non-crimp fabric.

The prepreg can be produced with a known method using the composition of this embodiment and the reinforcing fibers described above.

<Fiber-Reinforced Composite Material>

A fiber-reinforced composite material is obtained by curing the prepreg described above by means of heating.

EXAMPLES

The present technology is described below in detail using examples but the present technology is not limited to such examples.

<Preparation of Epoxy Resin Compositions>

The epoxy resins and phenoxy resins shown in Table 1 were mixed for 2 hours at 140° C. and dissolved uniformly. After the temperature was lowered to 70° C., prescribed amounts (parts by mass) of a curing agent and a curing accelerator were added and mixed uniformly to prepare each composition.

<Preparation of a Prepreg>

A prepreg was prepared by impregnating a glass fabric (fiber basis weight: 104 g/m$^2$) so that the resin content was 45% (resin weight: 85 g/m$^2$).

<Test Method>

The storage stability was evaluated using a prepreg obtained as described above. In addition, combustion tests, the glass transition temperature Tg, the compressive strength, and the compressive elastic modulus were respectively measured using a cured product (fiber-reinforced composite material) obtained by curing this prepreg for 2 hours at 120° C. in an autoclave.

[Storage Stability]

The storage stability was evaluated by assessing the presence or absence of tack (adhesive force) after the resulting prepreg was exposed for 14 days at room temperature by touching the prepreg with the fingers in an environment at 25° C. The tack was evaluated by touching under the following criteria.

○: Product in which a sufficient adhesive force was felt on the surface of a plate-like member x: Product in which a slight adhesive force or practically no adhesive force was felt on the surface of the plate-like member

[Flame Retardancy]

A fiber-reinforced composite material formed by laminating 6 prepregs and curing the prepregs in an autoclave was cut to 7.62 cm×30.48 cm to prepare a test piece. The flame retardancy was evaluated by a vertical flame test using the prepared test piece. FIG. 1 illustrates the state of the vertical flame test. As illustrated in FIG. 1, after the test piece 11 was fixed vertically and a flame was applied for 60 seconds with a burner 12 from directly below the test piece 11, the length L of the flame propagation was measured. The heat resistance was assessed as favorable when the length L of the flame propagation was at most 15.24 cm.

[Glass Transition Temperature Tg]

An autoclave cured product was cut to 3 mm×3 mm, and the glass transition temperature was found using a thermomechanical analysis (TMA) apparatus. The heat resistance was assessed as favorable when the glass transition temperature Tg was 120° C. or higher.

[Compressive Strength, Compressive Elastic Modulus]

A test piece was prepared in accordance with ASTM D695 from a fiber-reinforced composite material formed by laminating 21 prepregs and curing the prepregs in an autoclave, and the compressive strength and compressive elastic modulus were tested. The compressive strength was assessed as favorable when the compressive strength was at least 500 MPa, and the compressive elastic modulus was assessed as favorable when the compressive elastic modulus was at least 20 GPa.

TABLE 1

|  | Epoxy equivalents | Working Example 1 | Working Example 2 | Working Example 3 | Working Example 4 | Working Example 5 | Working Example 6 |
|---|---|---|---|---|---|---|---|
| Phosphorus-containing epoxy resin 1 | 232 | 90 | 75 | 80 | 80 | 80 | 75 |
| Phosphorus-containing epoxy resin 2 | 230 |  | 25 |  |  |  | 25 |
| Phosphorus-containing epoxy resin 3 | 4000 |  |  |  |  |  |  |
| Bis F epoxy resin | 170 | 10 |  |  |  |  |  |
| Bis A epoxy resin | 190 |  |  | 20 | 20 | 20 |  |
| Phenol novolac resin | 177 |  |  |  |  |  |  |

TABLE 1-continued

| | | | | | | |
|---|---|---|---|---|---|---|
| Phenoxy resin | 10 | 10 | 10 | 10 | 10 | 10 |
| Dicyandiamide | 5 | 5 | 5 | 5 | 5 | 5 |
| Curing accelerator 1 | | | | | | |
| Curing accelerator 2 | 5 | 5 | 5 | | | 8 |
| Curing accelerator 3 | | | | | | |
| Curing accelerator 4 | | | | 5 | | |
| Curing accelerator 5 | | | | | 5 | |
| Total amount | 120.0 | 120.0 | 120.0 | 120.0 | 120.0 | 123.0 |
| Phosphorus content | 1.50 | 1.70 | 1.33 | 1.33 | 1.33 | 1.70 |
| Curability (120° C. × 2 h) | ○ | ○ | ○ | ○ | ○ | ○ |
| Storage stability | ○ | ○ | ○ | ○ | ○ | ○ |
| Flame retardancy (flame propagation length: cm) | 14.1 | 9.7 | 14.0 | 14.3 | 13.9 | 10.0 |
| Tg TMA (° C.) | 123 | 124 | 123 | 121 | 120 | 120 |
| Compressive strength (MPa) | 554 | 582 | 554 | 543 | 525 | 530 |
| Compressive elastic modulus (GPa) | 23 | 22 | 23 | 22 | 22 | 22 |

| | Epoxy equivalents | Comparative Example 1 | Comparative Example 2 | Comparative Example 3 | Comparative Example 4 | Comparative Example 5 |
|---|---|---|---|---|---|---|
| Phosphorus-containing epoxy resin 1 | 232 | 55 | 90 | 80 | | |
| Phosphorus-containing epoxy resin 2 | 230 | | | | | |
| Phosphorus-containing epoxy resin 3 | 4000 | | | | 35 | 35 |
| Bis F epoxy resin | 170 | | | | | |
| Bis A epoxy resin | 190 | 45 | 10 | 20 | | 100 |
| Phenol novolac resin | 177 | | | | 100 | |
| Phenoxy resin | | 10 | 10 | 10 | | |
| Dicyandiamide | | 5 | 5 | 5 | 7.5 | 7.5 |
| Curing accelerator 1 | | | 5 | | 5 | 5 |
| Curing accelerator 2 | | 5 | | | | |
| Curing accelerator 3 | | | | 3 | | |
| Curing accelerator 4 | | | | | | |
| Curing accelerator 5 | | | | | | |
| Total amount | | 120.0 | 120.0 | 118.0 | 147.5 | 147.5 |
| Phosphorus content | | 0.92 | 1.50 | 1.36 | 1.76 | 1.76 |
| Curability (120° C. × 2 h) | | ○ | Uncured | ○ | Insufficient curing | Insufficient curing |
| Storage stability | | ○ | ○ | x | ○ | ○ |
| Flame retardancy (flame propagation length: cm) | | 18.5 | — | — | — | — |
| Tg TMA (° C.) | | 121 | — | — | 87-100 | 87-100 |
| Compressive strength (MPa) | | 576 | — | — | — | — |
| Compressive elastic modulus (GPa) | | 23 | — | — | — | — |

The details of each of the components of each of the working examples and comparative examples shown in Table 1 are as follows.

Phosphorus-containing epoxy resin 1: trade name "TX-0921", produced by Tohto Kasei Co., Ltd.

Phosphorus-containing epoxy resin 2: trade name "FX-289z1", produced by Tohto Kasei Co., Ltd.

Phosphorus-containing epoxy resin 3: trade name "FX-289FA", produced by Tohto Kasei Co., Ltd.

Bisphenol F epoxy resin: trade name "YDF-170", produced by Tohto Kasei Co., Ltd.

Bisphenol A epoxy resin: trade name "YD-128", produced by Tohto Kasei Co., Ltd.

Phenol novolac epoxy resin: trade name "jER152", produced by JER Co., Ltd.

Phenoxy resin: trade name "YP-75", produced by Tohto Kasei Co., Ltd.

Dicyandiamide: trade name "DICY-15", produced by JER Co., Ltd.

Curing accelerator 1: 3-(3,4-dichlorophenyl)-1,1-dimethylurea, trade name "DCMU", produced by Hodogaya Chemical Co., Ltd.

Curing accelerator 2: 1,1'-(4-methyl-1,3-phenylene)bis(3,3-dimethylurea), trade name "DYHARD UR500", produced by Evonik Industries AG Curing accelerator 3: 1-benzyl-2-phenylimidazole, trade name "1B2PZ", produced by Shikoku Chemicals Corporation Curing accelerator 4: phenyl-dimethylurea represented by formula (1), trade name "DYHARD UR300", produced by Evonik Industries AG Curing accelerator 5: methylene-diphenyl-bisdimethylurea represented by formula (2), trade name "Omicure U-52", produced by CVC Specialty Chemicals, Inc.

As is clear from the results shown in Table 1, in Working Examples 1 to 6, the prepreg was cured at 120° C. and sufficient adhesiveness was felt on the surface of the plate-like member of the prepreg even after exposed for 14 days at room temperature. In addition, the fiber-reinforced composite material obtained by curing the prepreg yielded a flame propagation length of at most 15.24 cm, a compressive strength of at least 500 MPa, and a compressive elastic modulus of at least 20 GPa. Therefore, the epoxy resin compositions for fiber-reinforced composite materials obtained in Working Examples 1 to 6 were curable at 120° C. and demonstrated excellent storage stability, and cured products obtained from these epoxy resin compositions for fiber-reinforced composite materials had good flame retardancy, highly maintained strength, and excellent physical properties.

On the other hand, in Comparative Example 1, the prepreg cured at approximately 120° C., and a fiber-reinforced composite material was obtained, but the flame retardancy was low. In Comparative Example 2, the epoxy resin composition for a fiber-reinforced composite material was uncured at a curing temperature of approximately 120° C. In Comparative Example 3, the prepreg cured at approximately 120° C., and a fiber-reinforced composite material was obtained, but no adhesiveness was felt on the surface of the plate-like member of the prepreg after being exposed for 14 days at room temperature. In Comparative Examples 4 and 5, the epoxy resin compositions for fiber-reinforced composite materials cured at a curing temperature of approximately 120° C., and adhesiveness was felt on the surfaces of the plate-like members of the prepregs after being exposed for 14 days at room temperature. However, cracks appeared in the surface when light deformations were added to the prepregs. When immersed in a solvent (MEK), the surface layer softened, and there was a large amount of fluctuation with the value of Tg ranging from 87 to 100 and with difficulty confirming clear peaks. Therefore, curing can be considered insufficient, even though the epoxy resin compositions for fiber-reinforced composite materials were cured at approximately 120° C. Based on this result, the epoxy resin compositions for fiber-reinforced composite materials obtained by Comparative Examples 1 to 5 were uncured or insufficiently cured at 120° C. The cured products obtained from these epoxy resin compositions for fiber-reinforced composite materials demonstrated poor flame retardancy and inferior physical properties without maintaining strength. Further, even when the epoxy resin compositions could be cured at 120° C., the storage stability of the resulting cured products was poor. Therefore, it can be concluded that it is not possible to obtain prepregs or fiber-reinforced composite materials which are curable at 120° C., demonstrate excellent storage stability, and have good flame retardancy and excellent physical properties with the epoxy resin compositions for fiber-reinforced composite materials obtained by Comparative Examples 1 to 5.

In addition, since each epoxy resin composition for a fiber-reinforced composite material uses a dicyandiamide as the curing agent of the epoxy resin and does not use a halogenated epoxy resin or a phosphorus compound, it is possible to reduce the effects on the human body or the natural environment in comparison to epoxy resin compositions for fiber-reinforced composite materials typically used conventionally.

Therefore, since the epoxy resin compositions for fiber-reinforced composite materials of Working Examples 1 to 6 are curable at 120° C., demonstrate excellent storage stability, and are capable of reducing the effects on the human body, and since the cured products obtained from these epoxy resin compositions have excellent physical properties such as good flame retardancy and high strength, the reliability and safety of the prepregs can be enhanced. Accordingly, since the compositions of these embodiments are curable at 120° C., demonstrate excellent storage stability, and are environmentally sound and safe, and since the prepregs obtained from the compositions of these embodiments have excellent physical properties such as good flame retardancy and high strength, the compositions can be suitably used as fiber-reinforced composite materials for structural materials in aircraft, automobiles, or the like or for building materials.

What is claimed is:

1. An epoxy resin composition for a fiber-reinforced composite material comprising:
    a phosphorus-containing epoxy resin containing phosphorus in a skeleton thereof;
    at least one epoxy resin other than the phosphorus-containing epoxy resin;
    a dicyandiamide; and
    a curing accelerator containing at least one member selected from the group consisting of 1,1'-(4-methyl-1,3-phenylene)bis(3,3-dimethylurea), phenyl-dimethylurea represented by the following formula (1), and methylene-diphenyl-bisdimethylurea represented by the following formula (2);

Formula 1

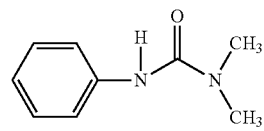

(1)

Formula 2

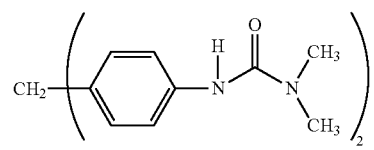

(2)

wherein the phosphorus-containing epoxy resin is present in an amount of at least 75 parts by mass and at most 95 parts by mass with respect to 100 parts by mass of the total amount of the epoxy resins; and
    wherein, the epoxy resin composition has a phosphorus content of at least 1.0 mass % and at most 5.0 mass %.

2. The epoxy resin composition for a fiber-reinforced composite material according to claim 1, wherein the content of the curing accelerator is at least 1 part by mass and at most 15 parts by mass with respect to 100 parts by mass of a sum of the mass of the phosphorus-containing epoxy resin and other epoxy resins.

3. A prepreg obtained by impregnating reinforcing fibers with the epoxy resin composition for a fiber-reinforced composite material according to claim 2.

4. The epoxy resin composition for a fiber-reinforced composite material according to claim 2, further comprising a phenoxy resin.

5. A prepreg obtained by impregnating reinforcing fibers with the epoxy resin composition for a fiber-reinforced composite material according to claim 4.

6. The epoxy resin composition for a fiber-reinforced composite material according to claim 4, wherein the content of the phenoxy resin is at least 5 parts by mass and at most 40 parts by mass with respect to 100 parts by mass of a sum of the mass of the phosphorus-containing epoxy resin and other epoxy resins.

7. A prepreg obtained by impregnating reinforcing fibers with the epoxy resin composition for a fiber-reinforced composite material according to claim 6.

8. The epoxy resin composition for a fiber-reinforced composite material according to claim 1, further comprising a phenoxy resin.

9. A prepreg obtained by impregnating reinforcing fibers with the epoxy resin composition for a fiber-reinforced composite material according to claim 8.

10. The epoxy resin composition for a fiber-reinforced composite material according to claim 8, wherein the content of the phenoxy resin is at least 5 parts by mass and at most 40 parts by mass with respect to 100 parts by mass of a sum of the mass of the phosphorus-containing epoxy resin and the other epoxy resins.

11. A prepreg obtained by impregnating reinforcing fibers with the epoxy resin composition for a fiber-reinforced composite material according to claim 10.

12. A prepreg obtained by impregnating reinforcing fibers with the epoxy resin composition for a fiber-reinforced composite material according to claim 1.

13. The epoxy resin composition for a fiber-reinforced composite material according to claim 1, wherein a phosphorus content of the phosphorus-containing epoxy resin is at least 1.3 mass % and at most 3.0 mass % in the epoxy resin composition.

14. The epoxy resin composition for a fiber-reinforced composite material according to claim 1, wherein the at least one epoxy resin other than the phosphorus-containing epoxy resin comprises a bisphenol epoxy resin.

15. The epoxy resin composition for a fiber-reinforced composite material according to claim 1, wherein a compounded amount of the dicyandiamide is such that a ratio of equivalents of active hydrogen in the dicyandiamide to equivalents of epoxy in the epoxy resin composition excluding the dicyandiamide is at least 0.5 and at most 1.

16. The epoxy resin composition for a fiber-reinforced composite material according to claim 15, wherein a compounded amount of the dicyandiamide is such that a ratio of equivalents of active hydrogen in the dicyandiamide to equivalents of epoxy in the epoxy resin composition excluding the dicyandiamide is at least 0.6 and at most 0.8.

17. The epoxy resin composition for a fiber-reinforced composite material according to claim 1, wherein the content of the curing accelerator is at least 3 part by mass and at most 10 parts by mass with respect to 100 parts by mass of a sum of the mass of the phosphorus-containing epoxy resin and other epoxy resins.

* * * * *